(12) United States Patent
Kohler et al.

(10) Patent No.: US 7,166,219 B2
(45) Date of Patent: Jan. 23, 2007

(54) METHOD OF PURIFYING FISCHER-TROPSCH DERIVED WATER

(75) Inventors: Luis Pablo Fidel Dancuart Kohler, Vaalpark (ZA); Gert Hendrik Du Plessis, Secunda (ZA); Francois Jacobus Du Toit, Sasolburg (ZA); Edward Ludovicus Koper, Secunda (ZA); Trevor David Phillips, Vanderbijlpark (ZA); Janette Van Der Walt, Vaalpark (ZA)

(73) Assignee: Sasol Technology (Pty) Ltd., Johannesburg (ZA)

( * ) Notice: Subject to any disclaimer, the term of this patent is extended or adjusted under 35 U.S.C. 154(b) by 178 days.

(21) Appl. No.: 11/015,654

(22) Filed: Dec. 16, 2004

(65) Prior Publication Data

US 2005/0131086 A1   Jun. 16, 2005

Related U.S. Application Data

(63) Continuation of application No. PCT/ZA03/00081, filed on Jun. 18, 2003.

(60) Provisional application No. 60/390,684, filed on Jun. 18, 2002.

(30) Foreign Application Priority Data

Jun. 18, 2002   (ZA)   ................ 2002/04848

(51) Int. Cl.
C02F 3/00   (2006.01)

(52) U.S. Cl. ............ 210/601; 210/615; 210/616; 210/617; 210/620; 210/631; 210/622

(58) Field of Classification Search ........ 210/601, 210/615–617, 620, 622, 631
See application file for complete search history.

(56) References Cited

U.S. PATENT DOCUMENTS

| | | | |
|---|---|---|---|
| 4,746,434 A | 5/1988 | Grieves et al. | |
| 4,948,511 A | 8/1990 | Swanson et al. | |
| 5,023,276 A | 6/1991 | Yarrington et al. | |
| 5,606,557 A | 2/1997 | Kuroshita et al. | |
| 5,607,557 A | 3/1997 | Streicher | |
| 6,225,358 B1 | 5/2001 | Kennedy | |
| 6,239,184 B1 | 5/2001 | Beer et al. | |

(Continued)

FOREIGN PATENT DOCUMENTS

DE   3532390 A   6/1986

(Continued)

OTHER PUBLICATIONS

Official Communication from corresponding U.S. Appl. No. 11/015,308, mailed on Dec. 15, 2005.

(Continued)

Primary Examiner—Chester T Barry
(74) Attorney, Agent, or Firm—Knobbe Martens Olson & Bear LLP

(57) ABSTRACT

A process for the production of highly purified water 44 from Fischer-Tropsch reaction water 12 includes distillation 14 as a primary treatment stage, biological treatment including anaerobic digestion 20 and aerobic digestion 22 as a secondary treatment stage, solid-liquid separation 32 as a tertiary treatment stage and a dissolved salt and organic removal stage 40 as final treatment stage.

20 Claims, 1 Drawing Sheet

U.S. PATENT DOCUMENTS

| | | | |
|---|---|---|---|
| 6,433,235 | B1 | 8/2002 | Cantrell |
| 6,462,097 | B1 | 10/2002 | Martino et al. |
| 6,585,802 | B2 | 7/2003 | Koros et al. |
| 6,756,411 | B2 | 6/2004 | Betts et al. |
| 6,797,243 | B2 | 9/2004 | Arcuri et al. |
| 6,824,574 | B2 | 11/2004 | O'Rear et al. |

FOREIGN PATENT DOCUMENTS

| | | | |
|---|---|---|---|
| DE | 3803905 | A | 8/1989 |
| DE | 19512385 | A | 10/1996 |
| DE | 19723607 | A | 12/1998 |
| FR | 2807027 | A | 10/2001 |
| GB | 2023120 | A | 12/1979 |
| JP | 59-046183 | A | 3/1984 |
| WO | WO 03/048272 | A | 6/2003 |
| WO | WO 03/106349 | A1 | 12/2003 |
| WO | WO 03/106354 | A | 12/2003 |

OTHER PUBLICATIONS

Official Communication received for related Great Britain patent application No. GB 0314085.2, dated Sep. 21, 2005.

Search Report for Equivalent Application—Great Britain Patent Application No. GB0314085.2, Date of Search Nov. 21, 2003.

Examination Report for Equivalent Application—Great Britain Patent Application No. GB0314085.2, Date of report Dec. 31, 2004.

Search Report for Equivalent Application—Netherlands Patent Application NL 1023695, Filed Jun. 18, 2003, Dated of Report Dec. 1, 2003.

Abstract for South African Patent Application No. ZA 8401928A (WPI abstract accession No. 1985-050193/198508, Derwent, May 03, 1985).

English Language Abstract for German Patent Application No. DE 3532390 A.

English Language Abstract for German Patent Application No. DE 3803905 A.

English Language Abstract for German Patent Application No. DE 19512385 A.

U.S. Appl. No. 11/015,308, filed Dec. 16, 2004, to Kohler, et al.

PCT International Search Report for PCT/ZA03/00081.

PCT Written Opinion for PCT/ZA03/00081.

PCT International Preliminary Examination Report for PCT/ZA03/00081.

METHOD OF PURIFYING FISCHER-TROPSCH DERIVED WATER

RELATED APPLICATIONS

This application is a continuation, under 35 U.S.C. § 120, of International Patent Application No. PCT/Za03/00081, filed on Jun. 18, 2003 under the Patent Cooperation Treaty (PCT), which was published by the International Bureau in English on Dec. 24, 2003, which designates the United States and claims the benefit of United States Provisional Patent Application No. 60/390,684, filed Jun. 18, 2002, and South Africa Application No. 2002/4848, filed Jun. 18, 2002, the disclosures of each of which are hereby incorporated by reference in their entireties and are hereby made a part of this specification.

FIELD OF THE INVENTION

This invention relates to the purification of water produced during Fischer-Tropsch synthesis for which synthesis a variety of carbonaceous materials are used as feedstock.

BACKGROUND OF THE INVENTION

The applicant is aware of processes for the synthesis of water from a carbonaceous feedstock, such as natural gas and coal, which processes also produce hydrocarbons.

One such process is the Fischer-Tropsch process of which the largest product is water and, to a lesser extent, hydrocarbons including olefins, paraffins, waxes, and oxygenates. There are numerous references to this process such as, for example on pages 265 to 278 of "Technology of the Fischer-Tropsch process" by Mark Dry, Catal. Rev. Sci. Eng., Volume 23 (1&2), 1981.

The products from the Fischer-Tropsch process may be processed further, for example by hydroprocessing, to produce products including synthetic crude oil, olefins, solvents, lubricating, industrial or medicinal oil, waxy hydrocarbons, nitrogen and oxygen containing compounds, motor gasoline, diesel fuel, jet fuel and kerosene. Lubricating oil includes automotive, jet, turbine and metal working oils. Industrial oil includes well drilling fluids, agricultural oils and heat transfer fluids.

In certain areas where carbonaceous feedstocks are to be found, water is in short supply and a relatively costly commodity. Also, environmental concerns prevent the dumping of polluted water derived from the Fischer-Tropsch process into natural water ways and the sea thereby presenting a case for the production and recovery of useable water at the source of the carbonaceous feedstocks.

The carbonaceous feedstocks typically include coal and natural gas that are converted to hydrocarbons, water and carbon dioxide during Fischer-Tropsch synthesis. Naturally, other carbonaceous feedstocks such as, for example, methane hydrates found in marine deposits, can also be used.

Before the water produced during the Fischer-Tropsch process is purified in accordance with the present invention, it is typically subjected to preliminary separation aimed at isolating a water-enriched stream from the Fischer-Tropsch products.

The preliminary separation process includes condensing the gaseous product from the Fischer-Tropsch reactor and separating it in a typical three-phase separator. The three streams exiting the separator are: a tail gas, a hydrocarbon condensate including mainly hydrocarbons in the $C_5$ to $C_{20}$ range and a reaction water stream containing dissolved oxygenated hydrocarbons, and suspended hydrocarbons.

The reaction water stream is then separated using a coalescer that separates the reaction water stream into a hydrocarbon suspension and a water-rich stream.

The coalescer is capable of removing hydrocarbons from the reaction water stream to a concentration of between 10 ppm and 1000 ppm, typically 50 ppm.

The water-enriched stream thus obtained forms the feedstock for the method according to the present invention and will be denoted in this specification by the term "Fischer-Tropsch reaction water".

The composition of the water-enriched stream or reaction water is largely dependent on the catalyst metal used in the Fischer-Tropsch reactor and the reaction conditions (e.g. temperature, pressure) employed. The Fischer-Tropsch reaction water can contain oxygenated hydrocarbons including aliphatic, aromatic and cyclic alcohols, aldehydes, ketones and acids, and to a lesser extent aliphatic, aromatic and cyclic hydrocarbons such as olefins and paraffins.

The Fischer-Tropsch reaction water may also contain small quantities of inorganic compounds including metals from the Fischer-Tropsch reactor, as well as nitrogen and sulphur containing species that originate from the feedstock.

The influence of the type of Fischer-Tropsch synthesis used on the quality of Fischer-Tropsch reaction water is illustrated in typical organic analysis (Table 1) of Fischer-Tropsch reaction water generated from three different synthesis operating modes, namely:

TABLE 1

Typical Organic Composition of Fischer-Tropsch reaction water from Different Fischer-Tropsch Synthesis Operating Modes

| Component (mass %) | LTFT (Cobalt Catalyst) | LTFT (Iron Catalyst) | HTFT (Iron Catalyst) |
| --- | --- | --- | --- |
| Water | 98.89 | 95.70 | 94.11 |
| Non-acid oxygenated hydrocarbons | 1.00 | 3.57 | 4.47 |
| Acidic oxygenated hydrocarbons | 0.09 | 0.71 | 1.40 |
| Other Hydrocarbons | 0.02 | 0.02 | 0.02 |
| Inorganic components | <0.005 | <0.005 | <0.005 |

Low Temperature Fischer-Tropsch LTFT Cobalt or Iron catalysts
High Temperature Fischer-Tropsch HTFT Iron catalyst It is evident from the typical analyses of Fischer-Tropsch reaction waters of different origin (Table 1) that these waters, in particular HT Fischer-Tropsch reaction water, contain relatively high concentrations of organic compounds, and direct application or disposal of these waters is generally not feasible without further treatment to remove undesirable constituents. The degree of treatment of the Fischer-Tropsch reaction water depends largely on the intended application, and it is possible to produce a wide range of water qualities ranging from boiler feed water to partially treated water which may be suitable for discharge to the environment.

It is also possible to co-treat Fischer-Tropsch reaction water with other typical process waste water as well as rain water.

The water purification processes described in this invention may, after making minor adaptations, also be used for the processing of aqueous streams derived from generic synthesis gas conversion processes using metallic catalysts similar to the catalysts used during Fischer-Tropsch synthesis.

SUMMARY OF THE INVENTION

According to a first aspect of the invention there is provided a process for the production of purified water from Fischer-Tropsch reaction water, which process includes at least the steps of:
a) a primary treatment stage comprising an equilibrium staged separation process having at least one stage for removing at least a fraction of non-acid oxygenated hydrocarbons from the Fischer-Tropsch reaction water to produce a primary water enriched stream;
b) a secondary treatment stage comprising biological treatment for removing at least a fraction of acidic oxygenated hydrocarbons from at least a portion of the primary water enriched stream to produce a secondary water enriched stream; and
c) a tertiary treatment stage comprising solid-liquid separation for removing at least some solids from at least a portion of the secondary water enriched stream.

The term "purified water" is to be interpreted as meaning an aqueous stream having a COD of between 20 and 500 mg/l, a pH of between 6.0 and 9.0, a suspended solids content of less than 250 mg/l and a total dissolved solids content of less than 600 mg/l.

The non-acid oxygenated hydrocarbons are typically comprised of compounds selected from the group including: alcohols, aldehydes and ketones, more specifically from the group including: acetaldehyde, propionaldehyde, butyraldehyde, acetone, methyl-propyl-ketone, methanol, ethanol, propanol, butanol, pentanol, hexanol, and heptanol.

The acidic oxygenated hydrocarbons are typically selected from the group including: formic acid, acetic acid, propionic acid, butyric acid, valeric acid, hexanoic acid, heptanoic acid, and octanoic acid.

A number of equilibrium staged separation processes are suitable for use in the primary treatment stage. Such processes may include conventional distillation processes typically used in the refining and petrochemical industry as well as solvent extraction using either conventional liquid solvents or liquefied gases.

When distillation is used as the primary treatment stage, the bulk of the non-acid oxygenated hydrocarbons contained in the Fischer-Tropsch reaction water are removed, leaving predominantly mono-carboxylic acids (e.g. acetic acid, propionic acid) and optionally trace quantities of non-acid compounds. As a result of the presence of organic acids, the primary water enriched stream is known as Fischer-Tropsch acid water.

The overheads from distillation may be recovered and worked-up to products, or may be used for fuel or as an energy source.

The primary treatment stage may include degassing of the Fischer-Tropsch reaction water before further processing to remove compounds having a very low boiling point and dissolved gases from the Fischer-Tropsch reaction water.

Typically, Fischer-Tropsch reaction water originating from HTFT iron catalyst processes which water has undergone primary treatment has limited application due to the relatively high concentrations (>1% by mass) of organic acids remaining in the Fischer-Tropsch acid water, and further treatment of the water is required. In contrast, Fischer-Tropsch reaction water originating from cobalt-based LTFT processes which water has undergone primary treatment contains significantly lower organic acid concentrations (<0.1% by mass) and can therefore, following neutralization, be released to the environment if sufficient dilution is available and discharge standards permit. This primary water enriched stream may also have limited application as process water.

The biological treatment may include anaerobic treatment or aerobic treatment or a combination of anaerobic and aerobic treatment. The anaerobic and/or aerobic treatment methods may be the same as are conventionally used for domestic and industrial wastewater treatment.

The anaerobic and/or aerobic treatment may include adding nutrients in the form of nitrogen (e.g. urea, ammonia or ammonium salts) and phosphorus (e.g. phosphate salts) containing compounds to accelerate microbiological degradation of the organic constituents. In addition, pH control using alkali salts such as lime, caustic and soda ash may be required due to the acidity of the water.

Fischer-Tropsch acid waters originating from both HTFT and LTFT processes lend themselves to anaerobic digestion since they contain mainly readily digestible short-chain mono-carboxylic acids such as acetic, propionic, butyric and valeric acids. Anaerobic technologies that have been successfully evaluated include Up-flow Anaerobic Sludge Blanket (UASB) processes, Fixed Bed systems, Fluidized Bed reactors, Stirred Tank reactors, Membrane Bioreactors, and Baffled reactors.

Apart from a water-rich stream, namely the secondary water enriched stream, anaerobic digestion typically yields methane, carbon dioxide and sludge as by-products.

The methane may be released to the environment via an acceptable system or, preferably, recovered. Recovered methane may be used as a fuel or energy source or returned for reforming (where natural gas is used as a feedstock for the Fischer-Tropsch synthesis process) or it may be chemically or biologically converted to products.

The sludge may be incinerated, used as land fill or as a fertiliser or soil conditioner.

A wide range of technologies may be used in the aerobic treatment of the water originating from step a). Such technologies may be selected from the group including: Activated Sludge processes, High-rate Compact Reactors, Biological Aerated Filters, Trickling filters, Rotating Biological Contacters, Membrane Bioreactors, and Fluidised Bed reactors. The aerobic production of Single Cell Protein (SCP) has also been successfully developed.

Apart from a water-rich stream, namely the secondary water enriched stream, aerobic treatment typically yields carbon dioxide and sludge as byproducts. The carbon dioxide may be released to the environment. The sludge may be incinerated, used as land fill, fertilizer, soil conditioner or as a source of SCP.

Removal of the majority of the organic material from Fischer-Tropsch acid waters originating from LTFT processes may be undertaken in a single biological treatment step.

Removal of the majority of the organic material from acid waters originating from HTFT processes may require a bulk organic carbon removal step (anaerobic digestion) followed by a second biological polishing step (aerobic digestion) to remove residual organic material (see also Example 2 below).

The tertiary treatment stage may be aimed at removing suspended solids from the secondary water-enriched stream produced during biological treatment.

Suspended solid removal may be achieved by methods selected from the group including: sand filtration, membrane separation (e.g. micro- or ultrafiltration), sedimentation (with or without the use of flocculants), dissolved air flotation (with or without the use of flocculants) and centrifugation.

Local discharge standards or the intended application will dictate the required level and type of tertiary treatment.

Applications for the purified water produced by the method described above may include its use as cooling water, irrigation water or general process water.

The purified water typically has the following characteristics:

| Property | | |
|---|---|---|
| Chemical Oxygen Demand (COD) | mg/l | 20–500 |
| pH | | 6.0–9.0 |
| Suspended Solids (SS) | mg/l | <250 |
| Total Dissolved Solids (TDS) | mg/l | <600 |

The Fischer-Tropsch reaction which generates the Fischer-Tropsch reaction water may also produce other Fischer-Tropsch products. These Fischer-Tropsch products may be processed further, for example by hydroprocessing, to produce products including synthetic crude oil, olefins, solvents, lubricating, industrial or medicinal oil, waxy hydrocarbons, nitrogen and oxygen containing compounds, motor gasoline, diesel fuel, jet fuel and kerosene. Lubricating oil includes automotive, jet, turbine and metal working oils. Industrial oil includes well drilling fluids, agricultural oils and heat transfer fluids.

According to a second aspect of the invention, there is provided a process for the production of highly purified water from Fischer-Tropsch reaction water, said process including at least the steps of:
a) a primary treatment stage including an equilibrium staged separation process having at least one stage for removing at least a fraction of non-acid oxygenated hydrocarbons from the Fischer-Tropsch reaction water to produce a primary water enriched stream;
b) a secondary treatment stage comprising biological treatment for removing at least a fraction of acidic oxygenated hydrocarbons from at least a portion of the primary water enriched stream to produce a secondary water enriched stream;
c) a tertiary treatment stage comprising solid-liquid separation for removing at least some solids from least a portion of the secondary water enriched stream to produce a tertiary water enriched stream; and
d) a final treatment stage comprising a dissolved salt and organic removal stage for removing at least some dissolved salts and organic constituents from at least a portion of the tertiary water enriched stream.

The term "highly purified water" is to be interpreted as meaning an aqueous stream having a COD of less than 50 mg/l, a pH of between 6.0 and 9.0, a suspended solids content of less than 50 mg/l and a total dissolved solids content of less than 100 mgl/.

The non-acid oxygenated hydrocarbons are typically comprised of compounds selected from the group including: alcohols, ketones and aldehydes, more specifically from the group including: acetaldehyde, propionaldehyde, butyraldehyde, acetone, methyl-propyl-ketone, methanol, ethanol, propanol, butanol, pentanol, hexanol, and heptanol.

The acidic oxygenated hydrocarbons are typically selected from the group including: formic acid, acetic acid, propionic acid, butyric acid, valeric acid, hexanoic acid, heptanoic acid, and octanoic acid.

A number of equilibrium staged separation processes are suitable for use in the primary treatment stage. Such processes may include conventional distillation processes typically used in the refining and petrochemical industry as well as solvent extraction using either conventional liquid solvents or liquefied gases.

When distillation is used as the primary treatment stage, the bulk of the non-acid oxygenated hydrocarbons contained in the Fischer-Tropsch reaction water are removed, leaving predominantly mono-carboxylic acids (e.g. acetic acid, propionic acid) and optionally trace quantities of non-acid compounds. As a result of the presence of organic acids, the primary water enriched stream is known as Fischer-Tropsch acid water.

The overheads from distillation may be recovered and worked-up to products, or may be used for fuel or as an energy source.

The primary treatment stage may include degassing of the Fischer-Tropsch reaction water before further processing to remove compounds having a very low boiling point and dissolved gases from the Fischer-Tropsch reaction water.

Typically, Fischer-Tropsch reaction water originating from HTFT iron catalyst processes which water has undergone primary treatment has limited application due to the relatively high concentrations (>1% by mass) of organic acids remaining in the FT acid water and further treatment of the water is required. In contrast, Fischer-Tropsch reaction water originating from cobalt-based LTFT processes which water has undergone primary treatment contains significantly lower organic acid concentrations (<0.1% by mass) and can therefore, following neutralization, be released to the environment if sufficient dilution is available and discharge standards permit. This water may also have limited application as process water.

The biological treatment may include anaerobic treatment or aerobic treatment or a combination of anaerobic and aerobic treatment. The anaerobic and/or aerobic treatment methods may be the same as are conventionally used for domestic and industrial wastewater treatment.

The anaerobic and/or aerobic treatment may include adding nutrients in the form of nitrogen (e.g. urea, ammonia or ammonium salts) and phosphorus (e.g. phosphate salts) containing compounds to accelerate microbiological degradation of the organic constituents. In addition, pH control using alkali salts such as lime, caustic and soda ash may be required due to the acidity of the water.

Fischer-Tropsch acid waters originating from both HTFT and LTFT processes lend themselves to anaerobic digestion since they contain mainly readily digestible short-chain mono-carboxylic acids such as acetic, propionic, butyric and valeric acids. Anaerobic technologies that have been successfully evaluated include Up-flow Anaerobic Sludge Blanket (UASB) processes, Fixed Bed systems, Fluidized Bed reactors, Stirred Tank reactors, Membrane Bioreactors, and Baffled reactors.

Apart from a water-rich stream, namely the secondary water-enriched stream, anaerobic digestion typically yields methane, carbon dioxide and sludge as by-products.

The methane may be released to the environment via an acceptable system or, preferably, recovered. Recovered methane may be used as a fuel or energy source or returned for reforming (where natural gas is used as a feedstock for the Fischer-Tropsch synthesis process) or it may be chemically or biologically converted to products.

The sludge may be incinerated, used as land fill or as a fertiliser or soil conditioner.

A wide range of technologies may be used in the aerobic treatment of the water originating from step a). Such technologies may be selected from group including: Activated Sludge processes, High-rate Compact Reactor, Biological Aerated Filters, Trickling filters, Membrane Bioreactors, and Fluidised Bed reactors. The aerobic production of Single Cell Protein (SCP) has also been successfully developed.

Apart from a water-rich stream, namely the secondary water-enriched stream, aerobic treatment typically yields carbon dioxide and sludge as byproducts. The carbon dioxide may be released to the environment. The sludge may be incinerated, used as land fill, fertilizer, soil conditioner or as a source of SCP.

Removal of the majority of the organic material from Fischer-Tropsch acid waters originating from LTFT processes may be undertaken in a single biological treatment step.

Removal of the majority of the organic material from acid waters originating from HTFT processes may require a bulk organic carbon removal step (anaerobic digestion) followed by a second biological polishing step (aerobic digestion) to remove residual organic material (see also Example 2 below).

The tertiary treatment stage may be aimed at removing suspended solids from the water-rich stream produced during biological treatment.

Suspended solid removal may be achieved by methods selected from the group including: sand filtration, membrane separation (e.g. micro- or ultrafiltration), sedimentation (with or without the use of flocculants), dissolved air flotation (with or without the use of flocculants) and centrifugation.

Residual organic species not removed during biological treatment and solids removal may be removed by methods selected from the group including: chemical oxidation using agents such as ozone and hydrogen peroxide, ultraviolet light generated free radicals and adsorption and/or absorption processes including activated carbon treatment and organic scavenging resins.

Dissolved salts, originating from secondary treatment (i.e. pH control chemicals, nutrient addition) and/or from the co-treatment of other process effluents, can be further reduced by methods selected from the group including: ion exchange, reverse osmosis, nano-filtration and chemical precipitation processes including hot and cold lime softening.

Applications for the highly purified water produced by the method described above may include its use as boiler feed water and drinking water.

The highly purified water typically has the following characteristics:

| Property | | |
|---|---|---|
| Chemical Oxygen Demand (COD) | mg/l | <50 |
| pH | | 6.0–9.0 |
| Suspended solids (SS) | mg/l | <50 |
| Total Dissolved Solids (TDS) | mg/l | <10 |

Advantages inherent in the purified and highly purified water produced according to the present invention are that the water will contain only a small amount of dissolved solids because the Fischer-Tropsch reaction water is essentially a dissolved solids-free stream. The low levels of residual salts in the purified water are a result of controlled addition of chemicals used during the purification process sequence and/or the co-treatment of other dissolved solids containing effluents. The residual salts could include Ca, Mg, Na, K, Cl, $SO_4$, $HCO_3$ and $CO_3$ combinations. The low dissolved solids concentrations in Fischer-Tropsch reaction water can simplify and reduce the costs of the purification process.

The Fischer-Tropsch reaction which generates the Fischer-Tropsch reaction water may also produce other Fischer-Tropsch products. These Fischer-Tropsch products may be processed further, for example by hydroprocessing, to produce products including synthetic crude oil, olefins, solvents, lubricating, industrial or medicinal oil, waxy hydrocarbons, nitrogen and oxygen containing compounds, motor gasoline, diesel fuel, jet fuel and kerosene. Lubricating oil includes automotive, jet, turbine and metal working oils. Industrial oil includes well drilling fluids, agricultural oils and heat transfer fluids.

DETAILED DESCRIPTION OF THE PREFERRED EMBODIMENT

Figure 1:
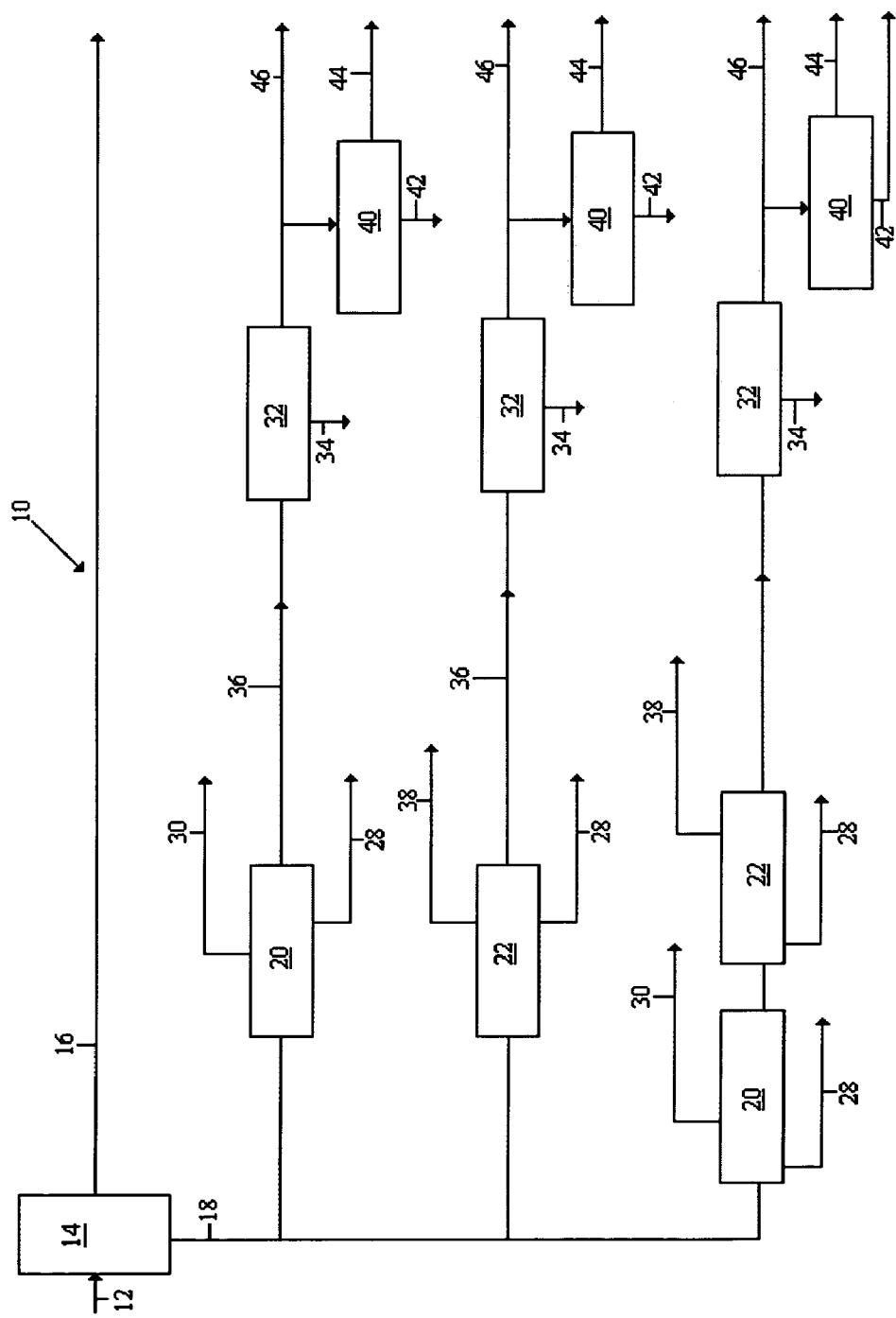
FIG. 1 shows a simplified block diagram of a method according to the present invention including various treatment options.

The invention will now be described by way of the following non-limiting examples with reference to the accompanying drawing.

FIG. 1 shows a simplified block diagram of a method according to the present invention including various treatment options.

The Fischer-Tropsch reaction water 12 is fed to a distillation column 14 for primary treatment.

Two streams 16 and 18 exit distillation column 14. Stream 16 contains predominantly organic constituents whilst stream 18 is a primary water enriched stream.

Stream 18 is then subjected to biological treatment. This can take the form of anaerobic treatment 20 and/or aerobic treatment 22. Apart from a secondary water-enriched stream 36, all three biological treatment options 20, or 22 and a combination of 20 and 22 produce sludge 28 and anaerobic treatment 20 in addition produces methane and carbon dioxide 30, whilst aerobic treatment produces carbon dioxide 38.

The next treatment stage involves solid-liquid separation 32 during which solids 34 and purified water 46 are produced.

An additional step involving the removal of dissolved salt and organic constituents 40 that produces concentrate 42 and highly purified water 44 can be performed after solid-liquid separation.

Depending on the final intended use of the purified 46 or highly purified water 44, the minimum water quality requirements are as set out in Table 2 below and the operating conditions of the equipment used in the method as well as suitable treatment options can be selected accordingly.

TABLE 2

Water Quality - Typical Requirements

|         | Process Water | Irrigation water | Cooling water | Boiler feed water | Drinking water |
|---------|---------------|------------------|---------------|-------------------|----------------|
| COD mg/l | 0–75 |  | 0–30 | 0–10 |  |
| pH | 5–10 | 6.5–8.4 | 6.5–8 | 7–8 | 6–9 |
| TDS mg/l | 0–1600 | <40 | 0–450 | 0–100 | 0–450 |
| SS mg/l | 0–25 | 0–50 | 0–5 | 0–3 | <20 |

EXAMPLES

Example 1

Treatment of Fischer-Tropsch Reaction Water from a Cobalt Catalyst LTFT Process

After separation of by-products, a water enriched stream from an LTFT process was degassed at atmospheric pressure. Free hydrocarbons in the water enriched stream were reduced to 0.01% (mass %) using a coalescer. The composition of the Fischer-Tropsch reaction water thus obtained is given in Table 1 above.

Primary treatment of the Fischer-Tropsch reaction water was undertaken using distillation. Analysis of the Fischer-Tropsch acid water bottoms of the distillation column is detailed in Table 3 below. With the exception of trace quantities of methanol, most other non-acid oxygenated hydrocarbons were removed from the FT reaction water during primary distillation leaving an organic acid enriched or primary water enriched stream (i.e. 0.074 mass % organic acids) with a pH value of 3.5. The measured Chemical Oxygen Demand (COD) of the primary water enriched stream was in the order of 800 mg $O_2$/l.

The primary water enriched stream was cooled from 70° C. to 35° C. using a plate heat exchanger and fed into an open equalization tank with a Hydraulic Residence Time (HRT) of 8–12 h.

The primary water enriched stream underwent activated sludge treatment (aerobic treatment) to remove organic components.

The activated sludge system was operated under the following conditions:
pH: 7.2 to 7.5
Dissolved oxygen concentration in basin: >2 mg/l
Temperature: 33–35° C.
HRT: ±30 h
COD loading rate: 0.5–1 kg $O_2/m^3$.d
F/M ratio: 0.2–0.4 kg COD/kg MLSS.d
Cell retention time (sludge age): 20 days
Feed to recycle ratio: 1:2.5
Nutrients in the form of nitrogen and phosphorous containing compounds were added to sustain the process.

During activated sludge treatment an average organic component removal efficiency of 92% (±2%) was achieved yielding an effluent containing 0.006% (mass %) residual organic matter and a COD concentration of 64 mg $O_2$/l. A sludge yield of 0.15 kg sludge/kg COD removed was obtained.

Activated sludge treatment yielded a secondary water-enriched stream that was subjected to sand filtration to reduce its SS concentration to 25 mg/l. The TDS of the purified water thus obtained was ca 50 mg/l. The purified water has application as a both irrigation water and process cooling water. Sludge produced in the process was incinerated.

In order to produce a highly purified water stream, a portion of the purified water from the sand filter was diverted to a cross-flow membrane unit fitted with a 0.2 μm polypropylene microfiltration membrane. A permeate flux rate of 70–80 l/m².h was obtained during stable operation of the unit, and the water recovery across the unit varied between 75–85%. The resultant SS and COD concentrations in the permeate from the microfiltration unit were <5 SS mg/l and 50 mg $O_2$/l, respectively.

The pH of the purified water from the microfiltration unit was adjusted to pH 8.5 using sodium hydroxide, and the purified water was pumped to a reverse osmosis unit fitted with a high rejection sea water polyamide membrane. A permeate flux rate of 15–25 l/m².h was obtained during stable operation of the unit, and the water recovery across the unit varied between 85–90%. The reverse osmosis unit yielded a highly purified water stream containing COD and TDS concentrations of <15 mg $O_2$/l and <10 mg TDS/l.

TABLE 3

Typical Composition of LT Fischer-Tropsch Reaction Water Feed and Acid Water Bottoms after Primary Treatment (Distillation)

| Component | Reaction water feed to primary distillation column (mass %) | Acid water - bottoms of primary distillation column (mass %) |
|---|---|---|
| Water | 98.830 | 99.920 |
| Total NAC | 1.096 | 0.001 |
| Total Acids | 0.073 | 0.074 |
| Other Hydrocarbons | 0.010 | <0.010 |

Example 2

Treatment of Fischer-Tropsch Reaction Water from an Iron Catalyst HTFT Process

After separation of by-products, a water enriched stream from an HTFT process was degassed at atmospheric pressure for a period of 30 min in an open vessel. Free hydrocarbons in the water enriched stream were reduced to 0.01% (mass %) using a coalescer. The composition of the Fischer-Tropsch reaction water thus obtained is given in Table 4 below.

Primary treatment of the HT Fischer-Tropsch reaction water was effected using distillation. Analysis of the acid water bottoms from the distillation column is detailed in Table 5 below. It is evident from this analysis that most non-acid components were removed from the FT reaction water during primary distillation leaving an organic acid enriched or primary water enriched stream containing 1.2% organic acids consisting predominantly of acetic acid. The measured COD of this stream was in the order of 16 000 mg $O_2$/l.

The primary water enriched stream was cooled from 60° C. to 35° C., and fed into an open equalization tank with a HRT of 8–12 h. The primary water enriched stream was fed to a Down-flow Packed Bed (DPB) anaerobic digester containing plastic packing material. Lime ($Ca(OH)_2$) was dosed into the feed to a concentration of 500 mg/l in order to adjust the pH from pH 3 to pH 4.5. Nutrients were also added to sustain the process.

The DPB anaerobic digester was operated under the following conditions:

Temperature—35 to 38° C.
pH—6.8–7.0
HRT—25–30 h
COD loading rate—12–16 kg $O_2/m^3$.d
Feed to recycle ratio—1:4

The COD and SS concentrations of the water enriched stream obtained from anaerobic digestion were ca. 1400 mg $O_2/l$ and ca. 500 mg SS/l, respectively. The COD removal across the reactor was in excess of 90%.

In order to further reduce the COD content, the water enriched stream obtained from anaerobic digestion was further subjected to aerobic treatment in an activated sludge basin.

Additional nutrient and lime dosing was not necessary and activated sludge treatment was conducted under the following conditions:

pH: 7.2 to 7.5
Dissolved oxygen concentration in basin: ±2 mg/l
Temperature: 33–35° C.
HRT: ±30 h
COD loading rate: 0.8–1.2 kg $O_2/m^3$.d
F/M ratio: 0.2–0.4 kg COD/kg MLSS.d
Cell retention time (sludge age): 20 days
Feed to recycle ratio: 1:2.5

A sludge yield of 0.15 kg sludge/kg COD removed was achieved and the sludge produced was incinerated. The activated sludge treated effluent contained COD and SS concentrations of 100 mg $O_2/l$ and 70 mg SS/l, respectively.

Activated sludge treatment yielded a secondary water-enriched stream that was subjected to sand filtration to reduce its SS concentration to 15 mg/l.

The calcium concentration in the thus obtained tertiary water-enriched stream was ca. 230 mg/l and cold lime softening was used to reduce the concentration of calcium to ca. 30 mg/l giving a final TDS concentration of 95 mg/l. During the abovementioned treatment steps the COD concentration was further reduced to 45 $O_2$ mg/l yielding a highly purified water stream.

TABLE 4

Composition of HT Fischer-Tropsch reaction water feed and acid water bottoms after primary distillation.

| Component | Reaction water feed to primary distillation column (mass %) | Acid water - bottoms of primary distillation column (mass %) |
| --- | --- | --- |
| Water | 94.00 | 98.799 |
| Total NAC | 4.80 | 0.001 |
| Total Acids | 1.20 | 1.20 |
| Hydrocarbons | 0.01 | <0.01 |
| COD (mg/l) | 78 000 | 16 000 |

It is to be appreciated that the invention is not limited to any specific embodiment or configuration as hereinbefore generally described or illustrated, for example, rain water or water enriched streams from processes other than Fischer-Tropsch synthesis may be purified according to the method described above.

What is claimed is:

1. A process for the production of a purified water from a Fischer-Tropsch reaction water comprising one or more components selected from the group consisting of oxygenated hydrocarbons, aliphatic, aromatic and cyclic hydrocarbons, inorganic compounds, and mixtures thereof, wherein the process comprises the steps of:

a) distilling the Fischer-Tropsch reaction water in a primary treatment stage, whereby at least a fraction of non-acid oxygenated hydrocarbons are removed from the Fischer-Tropsch reaction water to produce a primary water enriched stream;

b) conducting a biological treatment of the primary water enriched stream in a secondary treatment stage, whereby at least a fraction of acidic oxygenated hydrocarbons are removed from at least a portion of the primary water enriched stream to produce a secondary water enriched stream; and c) removing at least some solids from at least a portion of the secondary water enriched stream in a tertiary treatment stage, whereby a purified water is obtained, the purified water comprising an aqueous stream having a chemical oxygen demand of from 20 to 500 mg/l, a pH of from 6.0 to 9.0, a suspended solids content of less than 250 mg/l, and a total dissolved solids content of less than 600 mg/l.

2. The process as claimed in claim 1, wherein the non-acid oxygenated hydrocarbons are selected from the group consisting of alcohols, aldehydes, ketones, and mixtures thereof, and wherein the acidic oxygenated hydrocarbons are selected from the group consisting of formic acid, acetic acid, propionic acid, butyric acid, valeric acid, hexanoic acid, heptanoic acid, octanoic acid, and mixtures thereof.

3. The process as claimed in claim 1, wherein the primary treatment stage comprises degassing the Fischer-Tropsch reaction water before further processing in the primary treatment stage, whereby compounds having a very low boiling point and dissolved gases are removed from the Fischer-Tropsch reaction water.

4. The process as claimed in claim 1, wherein the biological treatment comprises at least one of anaerobic treatment and aerobic treatment.

5. The process as claimed in claim 4, wherein the aerobic treatment employs an apparatus or process selected from group consisting of activated sludge processes, biological aerated filters, trickling filters, rotating biological contacters, high-rate compact reactors, membrane bioreactors, fluidised bed reactors, and combinations thereof.

6. The process as claimed in claim 4, wherein the anaerobic treatment employs an apparatus or process selected from the group consisting of up-flow anaerobic sludge blanket processes, fixed bed systems, fluidized bed reactors, stirred tank reactors, membrane bioreactors, baffled reactors, and combinations thereof.

7. The process as claimed in claim 1, wherein the tertiary treatment stage comprises removing suspended solids from the secondary water-enriched stream produced during the biological treatment.

8. The process as claimed in claim 7, wherein removing at least some solids from at least a portion of the secondary water enriched stream employs a method selected from the group consisting of sand filtration, membrane separation, sedimentation with the use of flocculants, sedimentation without the use of flocculants, dissolved air flotation with the use of flocculants, dissolved air flotation without the use of flocculants, centrifugation, and combinations thereof.

9. A process for the production of a highly purified water from a Fischer-Tropsch reaction water comprising one or more components selected from the group consisting of oxygenated hydrocarbons, aliphatic, aromatic and cyclic hydrocarbons, inorganic compounds, and mixtures thereof, wherein the process comprises the steps of:

a) distilling the Fischer-Tropsch reaction water in a primary treatment stage, whereby at least a fraction of non-acid oxygenated hydrocarbons are removed from the Fischer-Tropsch reaction water to produce a primary water enriched stream;
b) conducting a biological treatment of the primary water enriched stream in a secondary treatment stage, whereby at least a fraction of acidic oxygenated hydrocarbons are removed from at least a portion of the primary water enriched stream to produce a secondary water enriched stream;
c) removing by solid-liquid separation at least some solids from at least a portion of the secondary water enriched stream in a tertiary treatment stage to produce a tertiary water enriched stream; and
d) removing at least a portion of dissolved salts and residual organic species from at least a portion of the tertiary water enriched stream in a final treatment stage, whereby a highly purified water is obtained, the highly purified water comprising an aqueous stream having a chemical oxygen demand of less than 50 mg/l, a pH of from 6.0 to 9.0, a suspended solids content of less than 50 mg/l, and a total dissolved solids content of less than 100 mg/l.

10. The process as claimed in claim 9 wherein the non-acid oxygenated hydrocarbons are selected from the group consisting of alcohols, ketones, aldehydes, and mixtures thereof, and wherein the acidic oxygenated hydrocarbons are selected from the group consisting of formic acid, acetic acid, propionic acid, butyric acid, valeric acid, hexanoic acid, heptanoic acid, octanoic acid, and mixtures thereof.

11. The process as claimed in claim 9, wherein the primary treatment stage comprises degassing the Fischer-Tropsch reaction water before further processing in the primary treatment stage, whereby compounds having a very low boiling point and dissolved gases are removed from the Fischer-Tropsch reaction water.

12. The process as claimed in claim 9, wherein the biological treatment comprises at least one of anaerobic treatment and aerobic treatment.

13. The process as claimed in claim 12, wherein the aerobic treatment employs an apparatus or process selected from group consisting of activated sludge processes, biological aerated filters, trickling filters, rotating biological contacters, high-rate compact reactors, membrane bioreactors, fluidised bed reactors, and combinations thereof.

14. The process as claimed in claim 12, wherein the anaerobic treatment employs an apparatus or process selected from the group consisting of up-flow anaerobic sludge blanket processes, fixed bed systems, fluidized bed reactors, stirred tank reactors, membrane bioreactors, baffled reactors, and combinations thereof.

15. The process as claimed in claim 9, wherein the tertiary treatment stage comprises removing suspended solids from the secondary water-enriched stream produced during the biological treatment.

16. The process as claimed in claim 15, wherein removing at least some solids from at least a portion of the secondary water enriched stream employs a method selected from the group consisting of sand filtration, membrane separation, sedimentation with the use of flocculants, sedimentation without the use of flocculants, dissolved air flotation with the use of flocculants, dissolved air flotation without the use of flocculants, centrifugation, and combinations thereof.

17. The process as claimed in claim 16, wherein the membrane separation comprises at least one of microfiltration and ultrafiltration.

18. The process as claimed in claim 9, wherein residual organic species are removed in the final treatment stage by a method selected from the group consisting of chemical oxidation, reaction with ultraviolet light generated free radicals, adsorption processes, absorption processes, and combinations thereof.

19. The process as claimed in claim 18, wherein the adsorption process or absorption process comprises a method selected from the group consisting of activated carbon treatment, use of organic scavenging resins, and combinations thereof.

20. The process as claimed in claim 9, wherein dissolved salts resulting from a process conducted in the secondary treatment stage or from co-treatment of other process effluents are reduced in the final treatment stage by a method selected from the group consisting of ion exchange, reverse osmosis, nano-filtration, chemical precipitation processes, and combinations thereof.

* * * * *